April 10, 1945. S. FISCHER 2,373,389

ADJUSTABLE OPTICAL MOUNTING

Filed Feb. 25, 1943

INVENTOR.
Sidney Fischer
BY Harry Jacobson
ATTORNEY

Patented Apr. 10, 1945

2,373,389

UNITED STATES PATENT OFFICE 2,373,389

ADJUSTABLE OPTICAL MOUNTING

Sidney Fischer, New York, N. Y., assignor of one-half to Emanuel M. Fischer, New York, N. Y.

Application February 25, 1943, Serial No. 477,059

7 Claims. (Cl. 2—14)

This invention relates to optical mountings such as goggles and particularly to the means for adjusting the interpupillary distance between the eye lenses of such mountings.

In goggles used by lookouts as on ships, the eye lenses, usually of the fixed focus type, have heretofore been fixedly secured in place in the casing therefor, and no means has been provided for adjusting the lenses to space them apart the required distance corresponding to the eye spacing of the individual user. The eyes of the user are consequently subjected to unnecessary strain after a short period, with consequent loss of efficiency, sometimes at crucial moments. Furthermore, the devices heretofore proposed for adjusting the eye pieces of other forms of goggles and optical mountings are cumbersome, complicated and expensive, while not entirely dependable particularly when subjected to the action of salt spray and sea air.

The present invention therefore contemplates the provision of a simple, efficient and economical device, easily installed and operated, and self-maintained against displacement for adjusting the interpupillary distance between the eye lenses of such optical mountings as lookout goggles and the like.

The invention further contemplates the provision of an inexpensive lens adjusting mechanism having a minimum number of parts, not likely to get out of order, rapidly operated when desired, having a wide range of adjustment, and well protected against the action of the atmosphere and of moisture.

The various objects of the invention will be clear from the description which follows and from the drawing, in which, Fig. 1 is a rear view, partly broken away, of a pair of lookout glasses or goggles embodying the invention.

Figure 1:
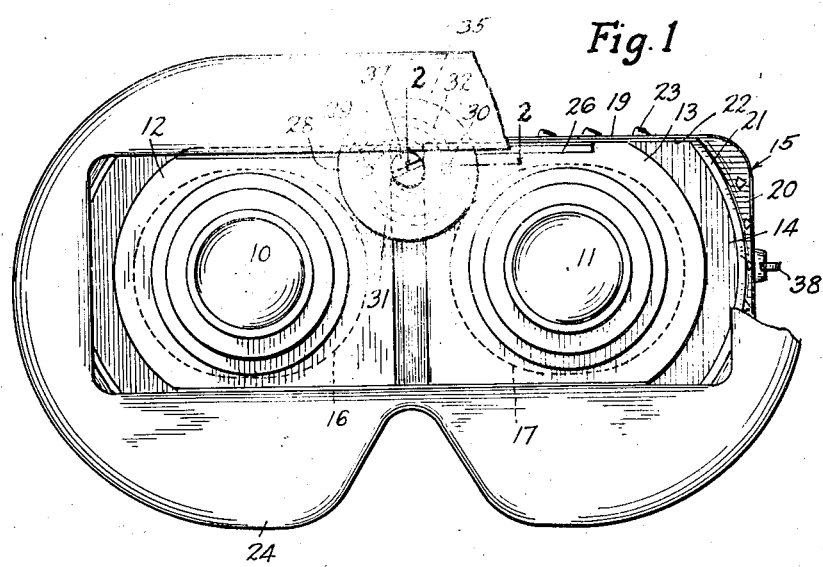
Figure 2:
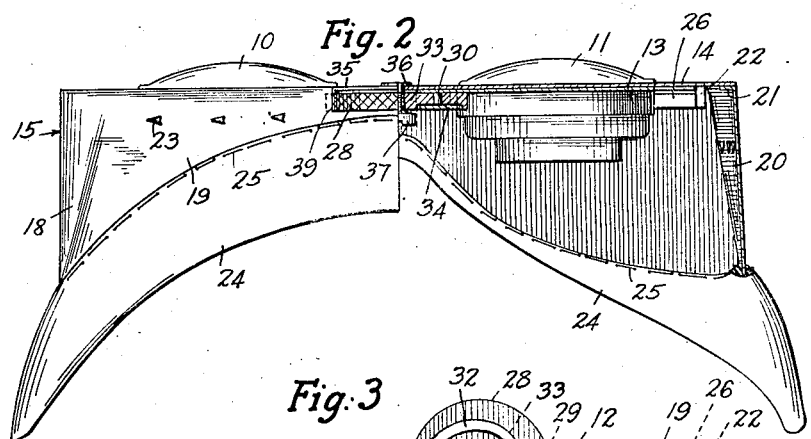
Fig. 2 is a combined top plan view and horizontal section of the same, the section being taken on the line 2—2 of Fig. 1.
Figure 3:
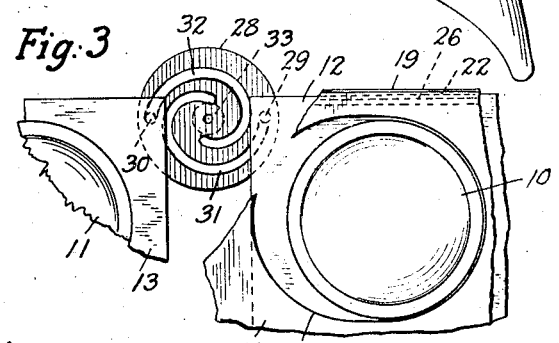
Fig. 3 is a fragmentary front view of the same, the casing being broken away to show the adjusting plates and the operating means therefor, the plates and lenses being shown in an adjusted position different from that shown in Fig. 1.

In the practical embodiment of the invention shown by way of example, the lenses 10 and 11 may be of the fixed focus type and are fixedly mounted in suitable openings in the respective adjusting plates 12 and 13. Said plates are comparatively thin and are preferably substantially in contact with the rear face of the front wall 14 of the casing which is designated generally by the numeral 15. A pair of transversely elongated and suitably spaced openings 16 and 17 are made in the wall 14 for the passage of the lenses therethrough and to permit the lenses to move therein relatively to the casing with the plates as the plates are adjusted.

The body portion 18 of the casing consists of the top wall 19, a bottom wall, and suitably shaped side walls 20, each of the side walls terminating at the front thereof in a flange as 21 suitably secured to the rear face of the wall 14. The upper and lower edges of the front wall also terminate in flanges as 22 respectively secured to the top and bottom walls of the casing body 18. Suitable ventilating members as 23 provide openings in the casing, being pressed from the material of the casing body at the required points to permit the evacuation of moist air and to prevent the accumulation of moisture inside of the casing when it is in use. The face cushion or shield 24 of rubber or the like is suitably shaped to fit the face and is secured to the rear edges of the casing walls as by the stitching 25 passing through the shield and through suitable small openings in said rear edges.

Figure 4:
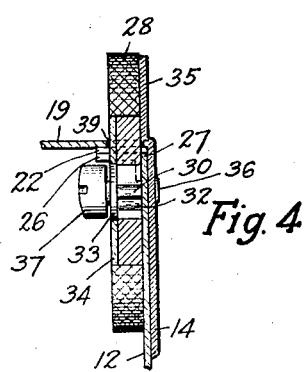
Fig. 4 is a vertical section of the same taken through the operating cam pin and the adjacent part of the casing.

To support the lens plate 13, 12 for proper sliding movement in the casing, and L-shaped or angle member as 26 is provided for each of the upper and lower edges of each of the plates. (Fig. 4.) The longer leg of the member is secured to the inner face of the flange 22, while the shorter leg is substantially in contact with the rear face of the lens-holding plates, thereby providing a groove as 27 in which the edge portions of the plates are held and in which the plate moves freely when adjusted. The angle members also maintain the plates against rattling in the casing and keep the lens openings 16, 17 closed at all times and in all adjusted positions of the plates, said plates being long enough for that purpose.

The means for adjusting the plates comprises merely the cam wheel 28 and the cooperating cam followers in the form of pins 29 and 30 on the respective plates 12, 13. Each of the pins extends rearwardly from its plate adjacent an upper inner corner thereof into a substantially spiral groove in the wheel. Two of such grooves 31, 32 are provided, one for each pin, the grooves being substantially identical and extending in the same direction, but beginning at points on the hub 33 of the wheel spaced angularly apart about 180 degrees.

It will therefore be noted that the inner part of each groove is adjacent and inside of the outer part of the other groove. Rotation of the cam wheel in a clockwise direction as viewed in Fig. 1 moves both pins away from each other simultaneously through the same distance, while rotation of the wheel in the opposite direction moves the pins toward each other. Owing to the guiding effect of the angle members 26 on the plates which fill the grooves 27, little force is required to move the plates accurately to their required adjusted positions, the walls of the cam grooves exerting all of the force necessary.

Preferably, the rear side of the wheel at the cam grooves is closed by the annular disc 34 fitted around the hub 33 to prevent the entrance of foreign matter into the cam grooves, the lower front part of the wheel at said grooves being protected by the plates and the upper front part protected by the arcuate member 35 upstanding from the front wall 14 at about the middle part of the flanges 22. The wheel projects above the top wall 19 of the casing through a suitable slot 39 in the top wall behind the member 35. Through the hub 33 of the wheel passes the hollow internally threaded rivet 36, flanged on to the front wall and flanged lightly on the rear face of the hub, said rivet serving as a pivot for the wheel. The screw 37 screwed into the rivet serves as an additional holding means for the wheel. By knurling the edge of the wheel as indicated, it is easily rotated by the finger of the user on the rivet 36, causing the walls of the cam grooves to move the pins 29, 30 and the plates 12, 13 together with the lenses 10, 11 in opposite directions toward or from each other as the case may be and thereby adjusting the positions of the lenses in the respective openings 16, 17 of the front wall. Since transverse pressure on the pins does not exert sufficient force to rotate the wheel, the plates are maintained in their adjusted positions until the wheel is rotated deliberately. By the substantially concentric arrangement of the cam grooves 31, 32, it becomes possible to use an adjusting wheel of comparatively small diameter, and by arranging the inner ends of the grooves at the hub of the wheel and the pins in transverse spaced relation to the respective plates, said edges of the plates may be brought close together and a comparatively wide range of adjustment attained, in less than a complete revolution of the wheel.

The casing may be supported on the head of the wearer by an elastic strap of the customary type attached by suitable clips to the rings or links 38 on each side wall of the casing.

Changes may obviously be made in the specific construction shown and described without departing from the spirit of the invention as defined in the appended claims.

I claim:

1. In an optical mounting, a casing having a front wall provided with a pair of transversely spaced elongated openings, a pair of plates inside of and slidable along the wall, a lens carried by each plate and arranged to project through one of the openings, a pin on each of the plates, means on the casing for guiding said plates, and means for moving the plates simultaneously in opposite directions comprising a cam wheel revolubly mounted on the wall, said wheel having a pair of substantially identical spiral cam grooves therein each beginning and ending at points spaced apart angularly approximately 180 degrees from the points of beginning and ending respectively of the other groove, each of the grooves receiving one of the pins.

2. In an optical mounting, a casing having a front wall provided with a pair of transversely spaced openings and open at its back, a pair of lens-holding members slidable transversely relatively to each other and to the casing, a lens carried by each member and slidable in one of the openings, and means for adjusting the members comprising a disc wheel arranged between the members and overlapping corresponding adjacent peripheral parts of the members, one of the faces of the wheel being provided with a pair of cam grooves, one of the grooves beginning at its inner end at one side of the axis of the wheel, and the other groove beginning at the opposite side of said wheel axis, both grooves extending from their respective points of beginning in substantially a counterclockwise direction, a pivot for the wheel carried by the casing and arranged with its axis parallel to the axes of the lenses and a cam follower outstanding perpendicularly from each of the lens-holding members and having a free end portion entering one of the grooves.

3. In an optical mounting, a pair of lens-holding members, and means for moving the members simultaneously in opposite directions to adjust the interpupillary distance between the lenses thereof, said means comprising a revoluble disc-like member having a relatively fixed pivot, a common support for all of the members, said disc-like member having a pair of substantially identical cam grooves therein beginning at their inner ends at points respectively on opposite sides of the pivot and a pin outstanding from each of the respective lens-holding members and entering one of the grooves.

4. An optical mounting according to claim 3 wherein each of said grooves is substantially in the form of a spiral spaced angularly from the other groove at an angle of approximately 180 degrees and coplanar therewith.

5. In an optical mounting, a casing having a front wall provided with an opening, said casing being open at its rear and having ventilating openings therein, a plate having an opening therein substantially registering with and smaller than the opening of the wall, a lens fixed in the opening of the plate, a pair of spaced angle members supported by the casing adjacent the front wall and rearwardly of the plate and constituting guides for opposed edges of the plate, a cam follower on the plate adjacent one of the angle members, and a rotatable grooved cam supported by the casing and receiving the cam follower in the groove thereof.

6. In an optical mounting, a casing having a front wall provided with a transversely elongated opening, a lens-holding member having an opening therein of less width than the opening of the wall, said member being arranged at the rear face of the wall and movable relatively to the wall to shift the opening therein relatively to the wall opening, a lens carried by the member in the opening thereof, and revoluble means for moving the member to adjust the position of the lens in the opening of the wall, said means comprising a disc wheel having the front face thereof closely adjacent the rear face of the member, a pivot for the wheel arranged below the top of the member and at a distance from a side edge of the member less than the radius of the wheel, the pivot being carried by the casing thereby to arrange the wheel in overlapping relation to the member and with the greater part of the wheel below the casing and in the interior of the casing, the wheel having a spiral cam groove in the front face thereof in closely adjacent relation to the rear face of the member, and a pin projecting perpendicularly from that portion of the member overlapped by the wheel a distance less than the thickness of the wheel and entering the groove.

7. In an optical mounting, a pair of transversely spaced lenses, and means for adjusting the interpupillary distance between the lenses comprising a lens holder for each lens, a cam follower on each lens holder, and a revoluble cam having a pair of angularly spaced coplanar spiral cam grooves therein each receiving the cam follower of one of the lens holders, one of the grooves beginning at a point on one side of the axis of the cam and the other groove beginning at a point on the opposite side of said axis.

SIDNEY FISCHER.